United States Patent
Akimoto et al.

(10) Patent No.: US 10,837,905 B2
(45) Date of Patent: Nov. 17, 2020

(54) OPTICAL SENSOR

(71) Applicant: KABUSHIKI KAISHA TOSHIBA, Minato-ku (JP)

(72) Inventors: Yosuke Akimoto, Yokohama (JP); Kaita Imai, Edogawa (JP); Shouhei Kousai, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/352,067

(22) Filed: Mar. 13, 2019

(65) Prior Publication Data
US 2020/0088640 A1 Mar. 19, 2020

(30) Foreign Application Priority Data

Sep. 14, 2018 (JP) .................... 2018-172625

(51) Int. Cl.
G01N 21/64 (2006.01)

(52) U.S. Cl.
CPC ... *G01N 21/6428* (2013.01); *G01N 2201/062* (2013.01)

(58) Field of Classification Search
CPC ......... G01N 21/6428; G01N 2201/062; G01N 21/65; G01N 2201/0635; G01J 3/2803; G01J 2003/1213; G01J 3/10; G01J 3/0229; G01J 3/427; G01J 9/0246
See application file for complete search history.

(56) References Cited

U.S. PATENT DOCUMENTS

| | | | |
|---|---|---|---|
| 2010/0261158 A1* | 10/2010 | Nordman | G01N 21/6486 435/6.1 |
| 2012/0097864 A1* | 4/2012 | Takahashi | G01N 21/6452 250/458.1 |
| 2012/0300294 A1 | 11/2012 | Jess et al. | |
| 2018/0017492 A1 | 1/2018 | Kato et al. | |

(Continued)

FOREIGN PATENT DOCUMENTS

| | | |
|---|---|---|
| JP | 2000-97859 A | 4/2000 |
| JP | 2009-122203 A | 6/2009 |

(Continued)

OTHER PUBLICATIONS

Adachi New Industrial Companies "Low Angle Dependent Filter", https://www.adachi-new.com/archives/product/lowangle_beam?pt=104, 2013, 6 pages. (with English Translation).

*Primary Examiner* — David P Porta
*Assistant Examiner* — Fani Boosalis
(74) *Attorney, Agent, or Firm* — Oblon, McClelland, Maier & Neustadt, L.L.P.

(57) ABSTRACT

According to one embodiment, an optical sensor is disclosed. The sensor includes a bandpass filter which transmits light in a first wavelength band including a first wavelength, and includes a transmittance distribution of the light in the first wavelength band. The transmittance distribution has a maximal value at the first wavelength. The sensor further includes a notch filter which blocks transmission of light in a second wavelength band including a second wavelength shorter than the first wavelength, and includes a transmittance distribution of light in the second wavelength band. The transmittance distribution has a first minimal value at the second wavelength.

9 Claims, 5 Drawing Sheets

(56) References Cited

U.S. PATENT DOCUMENTS

2018/0372640 A1 12/2018 Kaneko
2019/0195688 A1* 6/2019 Atabaki .................... G01J 3/44

FOREIGN PATENT DOCUMENTS

| | | |
|---|---|---|
| JP | 2011-28187 | 2/2011 |
| WO | WO 2009/028136 A1 | 3/2009 |
| WO | WO 2013/105374 A1 | 7/2013 |
| WO | WO 2017/169083 A1 | 10/2017 |

* cited by examiner

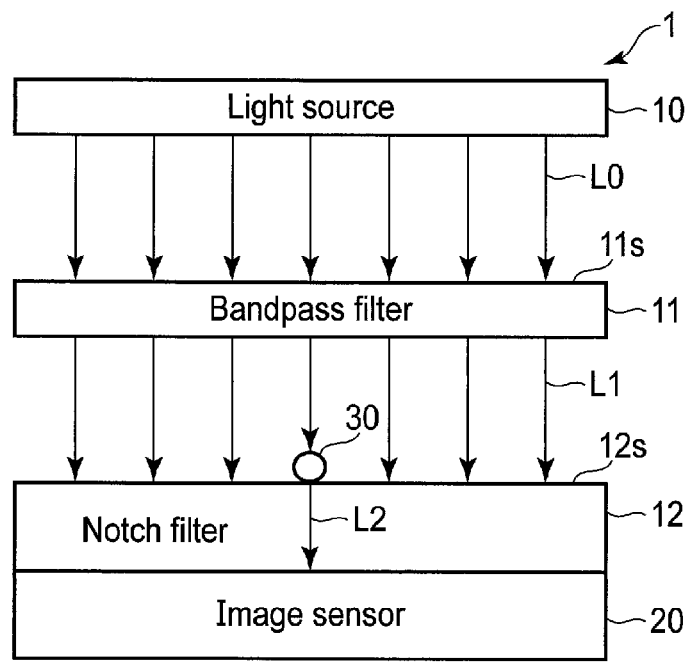
F I G. 1
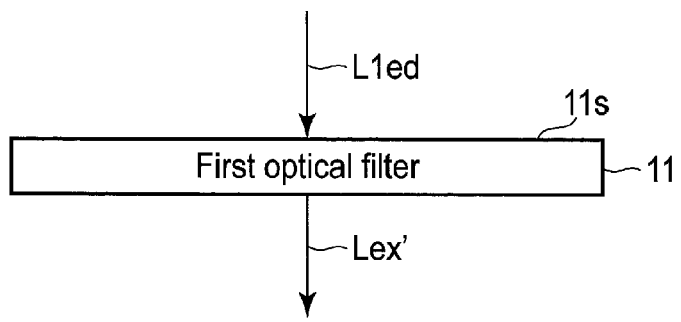
F I G. 2A
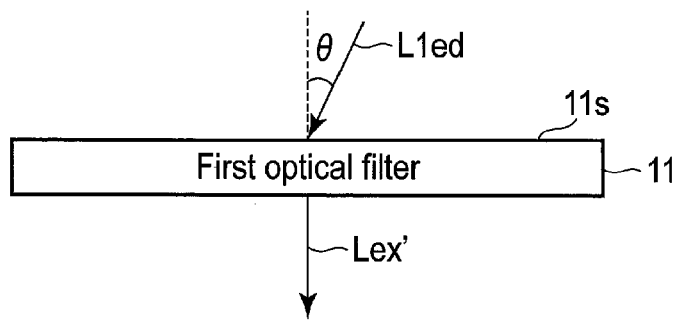
F I G. 2B

OPTICAL SENSOR

CROSS-REFERENCE TO RELATED APPLICATIONS

This application is based upon and claims the benefit of priority from Japanese Patent Application No. 2018-172625, filed Sep. 14, 2018, the entire contents of which are incorporated herein by reference.

FIELD

Embodiments described herein relate generally to an optical sensor.

BACKGROUND

As a detection device which detects a detection target object in a liquid, an optical sensor is employed. The detection target object is, for example, a cell, and the cell is stained with, for example, fluorescent dyes. If the fluorescently-stained cell is illuminated with light (excitation light), the fluorescently-stained cell emits fluorescence. The fluorescence is detected by the optical sensor. In this type of optical sensor, an improvement of detection sensitivity is required.

BRIEF DESCRIPTION OF THE DRAWINGS

FIG. 1 is a schematic diagram showing an optical sensor according to the first embodiment.

FIGS. 2A and 2B are explanatory diagrams showing the angle dependency of a bandpass filter.

DETAILED DESCRIPTION

Figure 3:
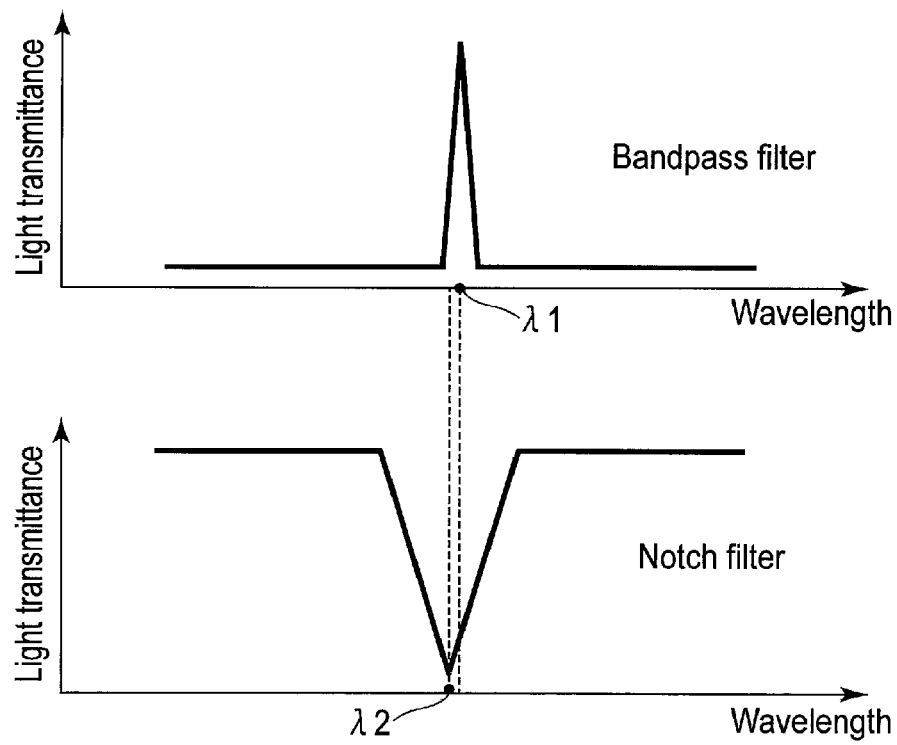
FIG. 3 is a diagram showing the relationship between the wavelength dependency of the light transmittance of the bandpass filter and the wavelength dependency of the light transmittance of a notch filter.

In general, according to one embodiment, an optical sensor is disclosed. The sensor includes a bandpass filter which transmits light in a first wavelength band including a first wavelength, and includes a transmittance distribution of the light in the first wavelength band. The transmittance distribution has a maximal value at the first wavelength. The sensor further includes a notch filter which blocks transmission of light in a second wavelength band including a second wavelength shorter than the first wavelength, and includes a transmittance distribution of light in the second wavelength band. The transmittance distribution has a first minimal value at the second wavelength.

Embodiments will be described hereinafter with reference to the accompanying drawings. The drawings are schematic or conceptual drawings and do not necessarily show what is actually implemented. In addition, the same reference numbers are assigned to the same or corresponding portions and duplicate explanations are provided only when necessary. In addition, as used in the description and the appended claims, what is expressed by a singular form shall include the meaning of "more than one."

First Embodiment

FIG. 1 is a schematic diagram showing an optical sensor 1 according to the first embodiment.

The optical sensor 1 of the present embodiment includes a light source 10, a bandpass filter 11, a notch filter 12 and an image sensor 20.

The light source 10 generates light L0 including first excitation light which excites first fluorescent dyes. The light source 10 is composed of, for example, a light-emitting diode (LED).

The bandpass filter 11 is arranged below the light source 10. The bandpass filter 11 has an incidence surface 11s for light. The light L0 generated at the light source 10 enters surface 11s. The bandpass filter 11 transmits light in the first wavelength band (bandwidth). The first wavelength band of the bandpass filter 11 includes the wavelength of first excitation light. Therefore, the first light L1 which has passed through the bandpass filter 11 includes the first excitation light.

The first light L1 which has passed through the bandpass filter 11 includes light (stray light) of a different wavelength from that of the first excitation light. To reduce stray light and improve the sensitivity of fluorescence detection, the first wavelength band should preferably be narrow and the ratio on the removal of wavelength bands other than the first wavelength band should preferably be $10^{-8}$ or less.

The notch filter 12 is arranged below the bandpass filter 11. The notch filter 12 has an incidence surface 12s for light. The first light L1 which has passed through the bandpass filter 11 enters the incidence surface 12s. The thickness of the notch filter 12 is, for example, less than or equal to 10 μm.

A specimen liquid (not shown) containing a detection target object 30 stained with the first fluorescent dyes is supplied on the incidence surface 12s. When specimen liquid is supplied on the incidence surface 12s, and then the detection target object 30 is illuminated with the first excitation light included in the first light L1, the detection target object 30 (the first fluorescent dyes) generates fluorescence L2.

The notch filter 12 blocks transmission of the light in the second wavelength band (blocking range). The second wavelength band of the notch filter 12 includes the wavelength of the first excitation light but does not include the wavelength of the fluorescence L2. Therefore, the fluorescence L2 passes through the notch filter 12 but the first excitation light does not pass through the notch filter 12.

The image sensor 20 is provided below the notch filter 12. The image sensor 20 captures an image of the fluorescence L2 which has passed through the notch filter 12. The image sensor 20 is, for example, an array sensor such as a complementary metal oxide semiconductor (CMOS) image sensor or a charge coupled device (CCD) image sensor.

Note that, the light source 10 may not be included as a part of the optical sensor 1. In that case, the light source 10 is prepared separately from the optical sensor 1 for detecting the detection target object 30.

FIGS. 2A and 2B are explanatory diagrams showing the angle dependency of the bandpass filter 11.

As shown in FIG. 2A, in a case where the first excitation light L1ed perpendicularly enters the incidence surface 11s, the first excitation light L1ed passes through the bandpass filter 11 and becomes excitation light Lex'. The first excitation light L1ed has a broad emission spectrum that is the original emission spectra of the light source (for example, an LED). The excitation light Lex' has such characteristics that the first excitation light L1ed is multiplied by the characteristics of the bandpass filter 11, and thus the excitation light Lex' has a sharp spectrum.

On the other hand, as shown in FIG. 2B, in a case where the first excitation light L1ed does not perpendicularly enter the incidence surface 11s, the first excitation light L1ed passes through the bandpass filter 11 and changes to light Lex' having a wavelength shorter than that of the first excitation light L1ed (wavelength shortening of excitation light). The degreed of wavelength shortening of the light Lex' is greater than that of the wavelength of the light Lex.

Note that, in FIG. 2B, a broken line indicates the normal to the incidence surface 11s and θ indicates an incidence angle of the first excitation light L1ed with respect to the incidence surface 11s. The bandpass filter 11 has such an angle dependency that the wavelength of the light Lex' decreases as the incidence angle θ increases.

The light Lex' (stray light) is not sufficiently absorbed in the notch filter 12, and part of the light Lex' enters the image sensor 20. The signal of the image of the fluorescence acquired by the image sensor 20 is buried in noise, and thus the sensitivity of fluorescence detection is reduced.

To prevent the wavelength shortening of the excitation light, for example, an illumination optical system including a lens which parallelizes the light L0 generated by the light source 10 may be employed. However, the size of the illumination optical system increases, and this makes it difficult to reduce the size of the optical sensor.

For this reason, the bandpass filter and the notch filter having the characteristics shown in FIG. 3 is employed in the present embodiment. FIG. 3 shows the relationship between the wavelength dependency of the light transmittance of the bandpass filter 11 shown in FIG. 1 and the wavelength dependency of the light transmittance of the notch filter 12 shown in FIG. 1.

In the present embodiment, the transmittance distribution of the light in the first wavelength band of the bandpass filter 11 has the first maximal value (peak) at the first wavelength $\lambda 1$. More specifically, the first wavelength $\lambda 1$ is the center wavelength of the wavelength bandwidth (the width at which the light transmittance in the first wavelength band halves).

The transmittance distribution of the light in the second wavelength band of the notch filter 12 has the first minimal value at the second wavelength $\lambda 2$. More specifically, the second wavelength $\lambda 2$ is the center wavelength of the wavelength bandwidth (the width at which the light transmittance in the second wavelength band halves). The second wavelength $\lambda 2$ is shorter than the first wavelength $\lambda 1$. In other words, the first wavelength $\lambda 1$ is set such that the wavelength of the first excitation light which has undergone the wavelength shortening will coincide with the second wavelength $\lambda 2$. Therefore, the notch filter 12 can sufficiently absorbs the first excitation light which has undergone the wavelength shortening, and thus the sensitivity of fluorescence detection is improved. Note that, the first wavelength $\lambda 1$ is determined, for example, based on a conceivable incidence angle θ.

Figure 4:
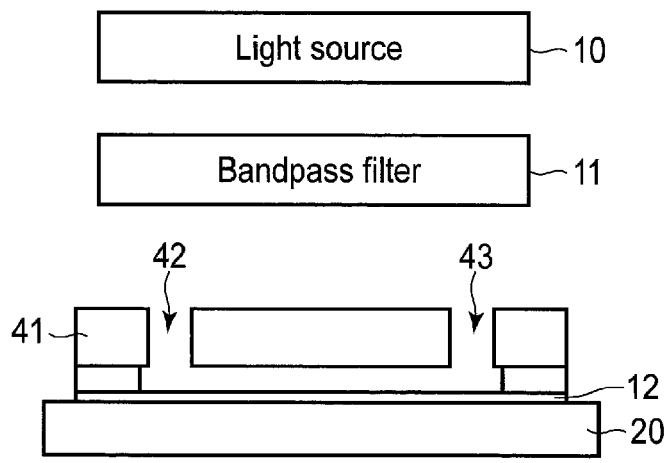
FIG. 4 is a sectional diagram schematically showing a detection device using the optical sensor according to the first embodiment.

FIG. 4 is a sectional diagram schematically showing a detection device using the optical sensor according to the present embodiment.

In FIG. 4, a structure indicated as 41 is a flow channel structure 41, and the flow channel structure 41 is composed of a material which transmits excitation light. The flow channel structure 41 includes a supply flow channel 42 which supplies a cleaning liquid and a specimen liquid onto the notch filter 12 and a collection flow channel 43 which collects the liquid (the cleaning liquid and the specimen liquid) on the notch filter 12. The specimen liquid contains detection target objects (not shown) stained with the fluorescent dyes. The detection target objects are, for example, pathogens such as viruses or bacteria. In addition, the detection target objects may be components of pathogens such as nucleic acids (DNA and RNA), proteins or cells.

Second Embodiment

In the present embodiment, an optical sensor which can achieve an improvement of detection sensitivity of two types of fluorescence having different wavelengths will be described.

Figure 5:
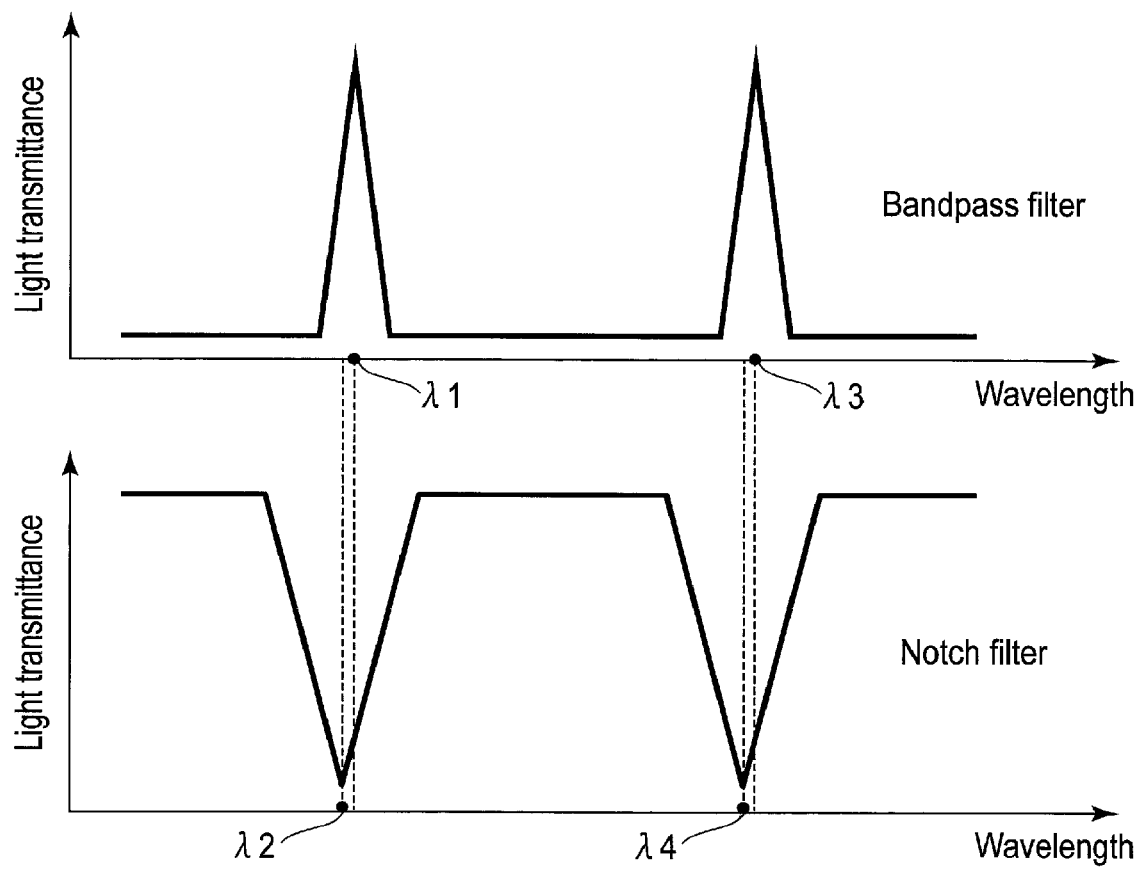
FIG. 5 is a diagram showing the wavelength dependencies of the light transmittances of the bandpass filter and the notch filter for explaining an optical sensor according to the second embodiment.

FIG. 5 is a diagram showing the wavelength dependencies of the light transmittances of the bandpass filter and the notch filter for explaining an optical sensor according to the second embodiment.

The bandpass filter of the present embodiment is, for example, a dielectric multilayer film including a silicon oxide film having a low refractive index and a titanium oxide film having a high dielectric constant. The bandpass filter transmits light in the first wavelength band and light of the third wavelength band. The first wavelength band includes the first wavelength $\lambda 1$, and the third wavelength band includes the third wavelength $\lambda 3$. The third wavelength $\lambda 3$ is the center wavelength of the wavelength bandwidth (the width at which the light transmittance in the third wavelength band halves). The transmittance distribution of the light in the first wavelength band has the first maximal value (peak) at the first wavelength $\lambda 1$. The transmittance distribution of the light in the third wavelength band has the second maximal value (peak) at the third wavelength $\lambda 3$.

The notch filter of the present embodiment is, for example, an organic film in which absorptive dyes such as porphyrin metal complexes or the like are dissolved in a binder resin such as an acrylic resin or a silicon resin. Regarding the materials used in the notch filter (such as the absorptive dyes and the binder resin), autofluorescence should preferably be low. The notch filter blocks transmission of the light in the second wavelength band and transmission of the light in the fourth wavelength band. The second wavelength band includes the second wavelength $\lambda 2$ and the fourth wavelength band includes the fourth wavelength $\lambda 4$. The fourth wavelength $\lambda 4$ is the center wavelength of the wavelength bandwidth (the width at which the light transmittance in the fourth wavelength band halves). The transmittance distribution of the light in the second wavelength band has the first minimal value at the second wavelength $\lambda 2$. The transmittance distribution of the light in the fourth wavelength has the second minimal value at the fourth wavelength $\lambda 4$.

The first wavelength $\lambda 1$ of the bandpass filter is set to be relatively high such that the wavelength of the first excitation light which has undergone the wavelength shortening will coincide with the second wavelength $\lambda 2$ of the notch filter. Furthermore, the third wavelength $\lambda 3$ of the bandpass filter is set to be relatively high such that the wavelength of the second excitation light which has undergone the wavelength shortening will coincide with the fourth wavelength λ4 of the notch filter.

Therefore, according to the present embodiment, the notch filter can sufficiently absorb the first excitation light which has undergone the wavelength shortening and the second excitation light which has undergone the wavelength shortening, and thus the detection sensitivity of two types of fluorescence having different wavelengths is improved.

Third Embodiment

Figure 6:
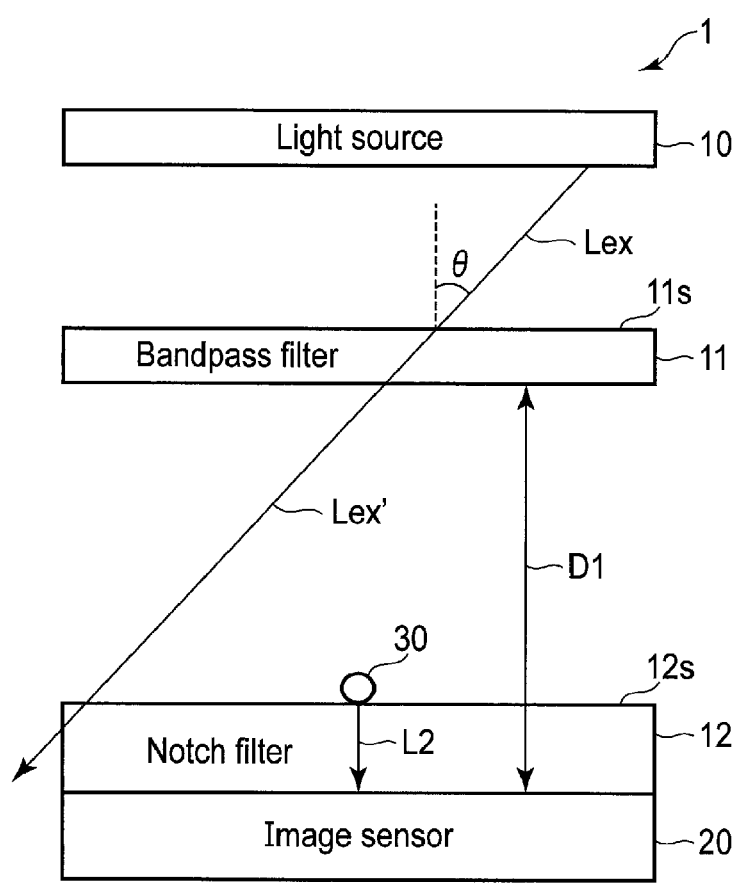
FIG. 6 is a schematic diagram showing an optical sensor according to the third embodiment.

FIG. 6 is a schematic diagram showing an optical sensor 1 according to the third embodiment.

The light source 10 generates light including the excitation light Lex. In a case where the excitation light Lex does not perpendicularly enter the incidence surface 11s of the bandpass filter 11, the excitation light Lex which has passed through the bandpass filter 11 becomes the light Lex' having a shorter wavelength than that of the excitation light Lex. The light Lex' degrades the sensitivity of fluorescence detection.

Therefore, in the present embodiment, a distance D1 between the bandpass filter 11 and the image sensor 20 is set to be a certain value or more, and the light Lex' is thereby prevented from entering the image sensor 20.

For example, when the chip size of the image sensor 20 is 5 mm, and the distance D1 is greater than or equal to 28 mm (D1≥28 mm), the light Lex' in the range of θ≥5 (predetermined value) can be prevented from directly entering the image sensor 20. In this case, to reduce the influence of the light Lex' in the range of θ<5, for example, the bandpass filter 11 and the notch filter 12 having the wavelength dependencies of the light transmittances described in the first embodiment will be employed.

It is possible to implement a detection device using the optical sensor of the present embodiment by setting the distance D1 between the bandpass filter 11 and the image sensor 20 to be a certain value or more in the detection device shown in FIG. 4.

Fourth Embodiment

Figure 7:
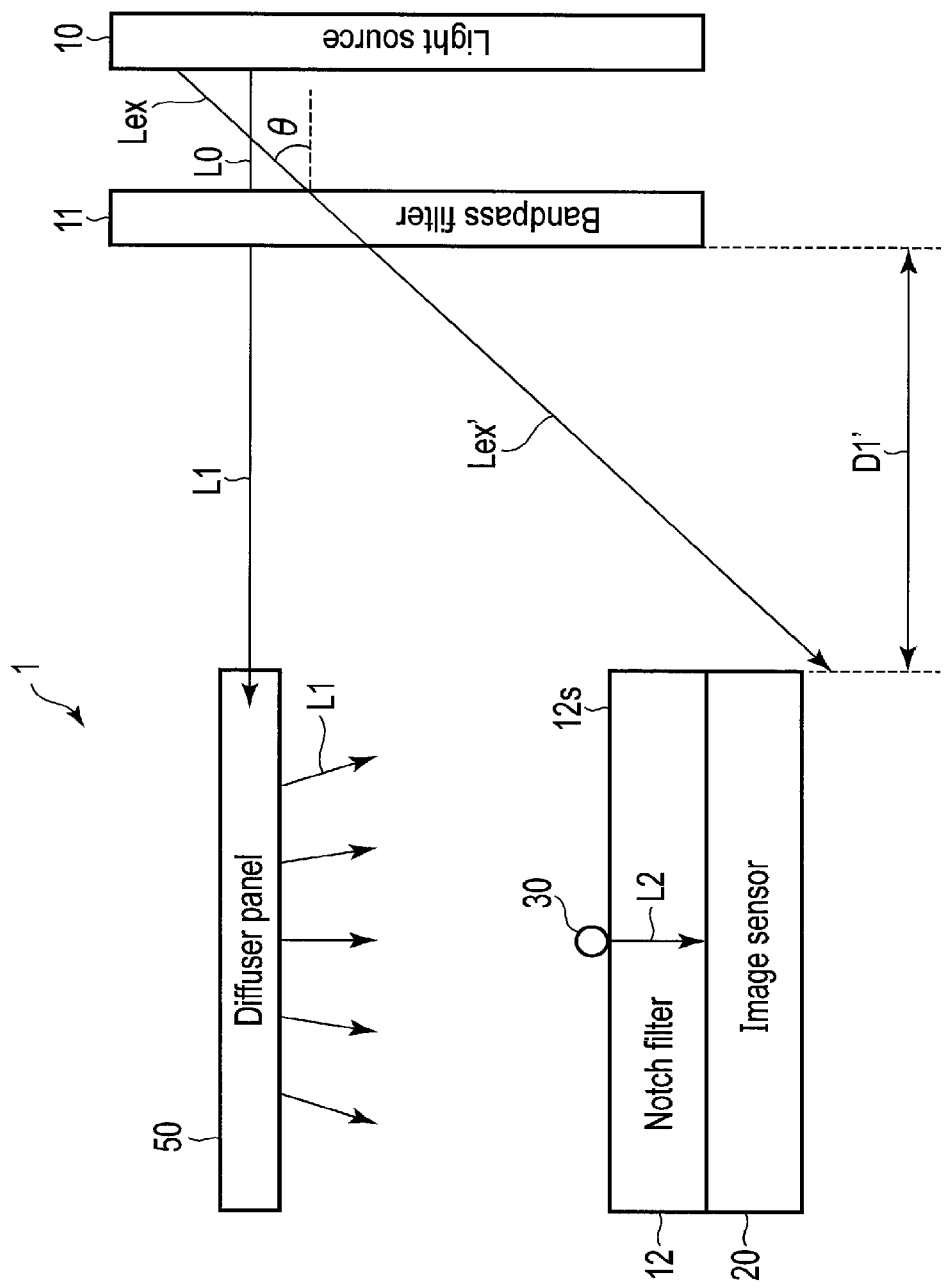
FIG. 7 is a schematic diagram showing an optical sensor according to the fourth embodiment.

FIG. 7 is a schematic diagram showing an optical sensor 1 according to the fourth embodiment.

In the present embodiment, the light source 10 and the bandpass filter 11 are arranged on the side surface side of the image sensor 20 and a distance D1' from a side surface of the image sensor 20 to the bandpass filter 11 is set to be a certain value or more, and the light Lex' is thereby prevented from entering the image sensor 20.

Note that, a light-shielding film (not shown) against the light Lex' may be provided on the side surface of the image sensor 20. The material of the light-shielding film is, for example, Al or Ti.

The notch filter 12 is arranged on the upper surface of the image sensor 20, and a diffuser panel 50 is arranged above the notch filter 12. The first light L1 which has passed through the bandpass filter 11 is diffused by the diffuser panel 50, and the diffused first light L1 enters the incidence surface 12s of the notch filter 12.

A detection device using the optical sensor of the present embodiment can be implemented by reconstructing the detection device shown in FIG. 4 such that the light source 10 and the bandpass filter 11 are arranged on the side surface of the image sensor 20, and the distance D1' from the side surface of the image sensor 20 to the bandpass filter 11 is set greater than or equal to a certain value, and the diffuser panel 50 is added.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical sensor comprising:
   a bandpass filter which transmits light in a first wavelength band including a first wavelength, and comprises a transmittance distribution of the light in the first wavelength band, the transmittance distribution having a first maximal value at the first wavelength;
   a notch filter which blocks transmission of light in a second wavelength band including a second wavelength shorter than the first wavelength, and comprises a transmittance distribution of light in the second wavelength band, the transmittance distribution having a first minimal value at the second wavelength; and
   an image sensor that is provided in a chip, provided to the notch filter and configured to capture an image of light having passed through the notch filter,
   wherein the notch filter is provided to be in contact with the chip.

2. The optical sensor of claim 1, wherein the first wavelength band is narrower than the second wavelength band, and the first wavelength band is within the second wavelength band.

3. The optical sensor of claim 1, wherein the first wavelength band includes a wavelength of excitation light which excites florescent dye, and the second wavelength band includes the wavelength of the excitation light.

4. The optical sensor of claim 3, wherein the notch filter transmits fluorescence from the fluorescent dye.

5. The optical sensor of claim 4, wherein the image sensor captures an image of the fluorescence having passed through the notch filter.

6. The optical sensor of claim 1, further comprising a light source, and wherein light from the light source enters the bandpass filter.

7. The optical sensor of claim 1, wherein the image sensor is a complementary metal-oxide semiconductor (CMOS) image sensor.

8. The optical sensor of claim 1, wherein
   the notch filter comprises an organic film that includes a binder resin and an absorptive dye dissolved in the binder resin, and
   the binder resin includes an acrylic resin or a silicon resin.

9. An optical sensor comprising:
   a bandpass filter which transmits light in a first wavelength band including a first wavelength, and comprises a transmittance distribution of the light in the first wavelength band, the transmittance distribution having a first maximal value at the first wavelength; and
   a notch filter which blocks transmission of light in a second wavelength band including a second wavelength shorter than the first wavelength, and comprises a transmittance distribution of light in the second wavelength band, the transmittance distribution having a first minimal value at the second wavelength, wherein the bandpass filter transmits light in a third wavelength band including a third wavelength, a transmittance distribution of the light in the third wavelength band has a second maximal value at the third wavelength, and the notch filter blocks transmission of light in a fourth wavelength band including a fourth wavelength, a transmittance distribution the light in the fourth wavelength band has a second minimal value at the fourth wavelength.

\* \* \* \* \*